Figure 1:
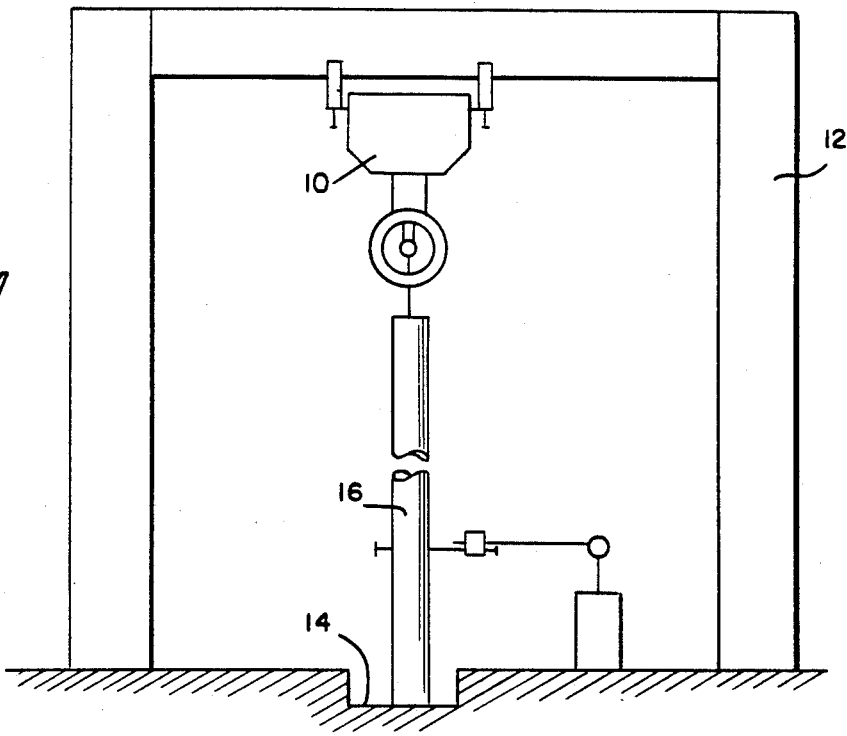

United States Patent [19]

King

[11] Patent Number: 4,615,809
[45] Date of Patent: Oct. 7, 1986

[54] METHOD FOR STABILIZATION OF SLUDGE

[75] Inventor: Gayle N. King, Terre Haute, Ind.

[73] Assignee: Velsicol Chemical Corporation, Chicago, Ill.

[21] Appl. No.: 734,021

[22] Filed: May 14, 1985

Related U.S. Application Data

[63] Continuation-in-part of Ser. No. 504,804, Jun. 16, 1983, abandoned.

[51] Int. Cl.⁴ ............................................. C02F 11/14
[52] U.S. Cl. ......................................... 210/751; 106/90; 106/103; 106/DIG. 1; 210/908; 405/129; 405/264
[58] Field of Search ...................... 106/89, 90, 96, 100, 106/103, DIG. 1; 210/729, 732, 751, 609, 710, 666, 908, 667, 691, 694; 208/13; 405/129, 263-265

[56] References Cited

U.S. PATENT DOCUMENTS

| | | | |
|---|---|---|---|
| Re. 29,783 | 9/1978 | Smith et al. | 210/751 |
| 3,565,648 | 2/1971 | Mori et al. | 106/89 |
| 3,582,376 | 6/1971 | Ames | 106/90 |
| 3,729,412 | 4/1973 | MacKenzie | 210/732 |
| 3,782,985 | 1/1974 | Gebhardt | 106/97 |
| 3,837,872 | 9/1974 | Conner | 106/74 |
| 3,854,968 | 12/1974 | Minnick et al. | 106/109 |
| 3,855,391 | 12/1974 | Selmeczi et al. | 423/242 |
| 3,859,799 | 1/1975 | Jaco, Jr. | 210/751 |
| 3,920,795 | 11/1975 | Selmeczi et al. | 423/242 |
| 3,947,213 | 3/1976 | Uchikawa et al. | 106/89 |
| 3,947,284 | 3/1976 | Kitsugi et al. | 106/89 |
| 3,980,558 | 9/1976 | Thompson | 210/751 |
| 4,028,130 | 6/1977 | Webster et al. | 106/120 |
| 4,053,401 | 10/1977 | Fukushima et al. | 210/729 |
| 4,124,405 | 11/1978 | Quienot | 106/111 |
| 4,149,968 | 4/1979 | Kupiec et al. | 210/751 |
| 4,209,335 | 6/1980 | Katayama et al. | 106/89 |
| 4,226,630 | 10/1980 | Styron | 106/85 |
| 4,230,568 | 10/1980 | Chappell | 210/751 |
| 4,274,880 | 6/1981 | Chappell | 106/90 |
| 4,304,674 | 12/1981 | Lazovsky et al. | 210/751 |
| 4,313,762 | 2/1982 | Pound | 106/85 |
| 4,338,134 | 7/1982 | Graf zu Munster | 106/85 |
| 4,340,396 | 7/1982 | Robinson-Todd | 23/293 R |
| 4,374,672 | 2/1983 | Funston et al. | 106/97 |
| 4,514,307 | 4/1985 | Chestnut et al. | 106/DIG. 1 |

OTHER PUBLICATIONS

"Protective Barriers for Containment of Toxic Materials—Solidification/Stabilization of Hazardous Wastes".

Primary Examiner—Peter Hruskoci
Attorney, Agent, or Firm—Barnes & Thornburg

[57] ABSTRACT

A method and means for the stabilization of organic sludges that includes combining the sludge with Portland cement, fly ash, calcium sulfate dihydrate, and lime, optimally with stabilizing agents such as clay, recycled rubber, and asphaltene, and an adsorbent for organic substances. The stabilized sludge compositions prepared in accordance with this method are characterized by a soil-like consistency and low-volume expansion relative to sludge volumes prior to stabilization.

15 Claims, 3 Drawing Figures

METHOD FOR STABILIZATION OF SLUDGE

This application is a continuation-in-part of application Ser. No. 504,804, filed June 16, 1983 now abandoned.

This invention relates to novel compositions and methods for use in stabilizing liquid or semiliquid waste material, particularly materials that are classified as organic sludges.

The problems involved in organic sludge disposal and in organic sludge containing hazardous waste disposal are numerous, including site selection, handling, shipment, and ultimate storage. Prior to the present invention, the methods and manner of treating organic sludges have been costly, dangerous, and often times ineffective.

The present invention provides method and means for solidifying organic sludges to a soil-like consistency. Such alteration of the sludge has a number of beneficial effects. The sludge can be handled with conventional earth-moving equipment, resulting in enormous savings to an organic sludge disposal operation; it allows the sludge (after being cured) to be compacted to densities that show very low water permeability and high stability, thus minimizing the danger of leaching that could lead to contamination of ground water and also minimizing the danger of run-off after the waste has been permanently sited; it permits the treated waste to be shaped to an overall uniform thickness with a built-in desired gradient without the danger of settling or distortion after shaping, thus facilitating the use of normal remedial programs including the use of conventional liner and capping technologies, once again resulting in enormous savings to an organic sludge disposal operation; and it allows the treated sludge, if need be, to be easily transported to more suitable landfill sites.

It is therefore an object of the present invention to stabilize organic sludges in an ecologically and economically feasible manner.

It is a further object of the invention to stabilize organic sludges in a manner permitting them to be handled with conventional waste-handling equipment.

Another object of the invention is to stabilize organic sludges to a soil-like consistency.

Another object of the invention is to convert organic sludges to a stabilized solid form having the low water permeability.

A further object of the invention is to stabilize organic sludge in a form which can be moved and shaped to an overall uniform thickness with a built-in desired gradient, without danger of settling or distortion after shaping, thus facilitating the use of normal remedial programs including conventional liner and capping technology.

An additional object of the invention is to stabilize organic sludge while minimizing the volume thereof.

It is still another object of the invention to stabilize organic sludge in a form that can be readily transported to suitable landfill sites.

In accordance with the present invention, an organic sludge is stabilized by mixing therewith appropriate amounts of Portland cement, fly ash, calcium sulfate dihydrate, and lime. The proportion of Portland cement can suitably range from about 1 to about 35% by weight based on the organics and solids content of the sludge, preferably between about 5 and about 35%, and optimally between about 10 and about 30%; the fly ash between about 10 and about 80%, preferably between about 20 and about 75%, and optimally between about 30 and about 70%; the calcium sulfate dihydrate between about 1 and about 54%, and optimally between about 11 and about 40%; and the lime between about 0.05 and about 10%, and preferably between about 0.1 and 5%. It should be noted that the fly ash commonly contains at least a small quantity of lime, which should be included in the calculation of lime added.

If desired, the mixture can also include up to about 25% of additional stabilizing agents such as clay, soil, recycled rubber, and asphaltenes to modify the properties of the completed composition, as well as adsorbent substances—e.g., activated clay, activated silica, activated carbon, and the like—to bind organic substances.

It is also within the scope of the present invention to use sludge stabilized in accordance with this invention as a component additive for stabilization of like or different sludge compositions. Indeed, some success has been realized using such stabilized sludge compositions as a partial substitute for the fly ash, $CaSO_4$, and lime components of the present sludge stabilization mixtures.

The total combination of sludge and additives should contain, or have added to it, a sufficient quantity of water to effect hydration of the cementitious components and to allow the mixture to be readily commingled. For this purpose, the amount of water can be determined in a known way, but in all cases a water content of 25 to 50% by weight in the total mixture is sufficient.

Figure 2:
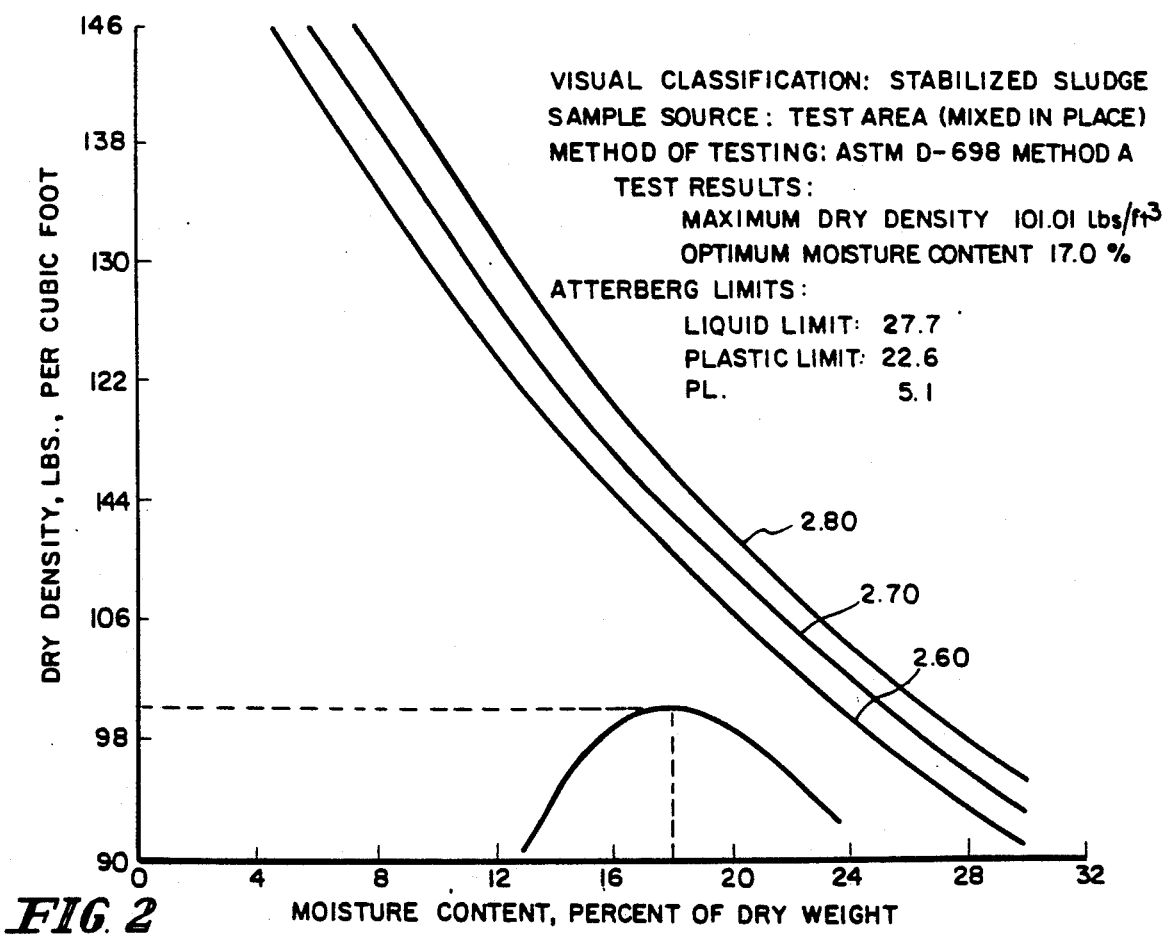
Figure 3:
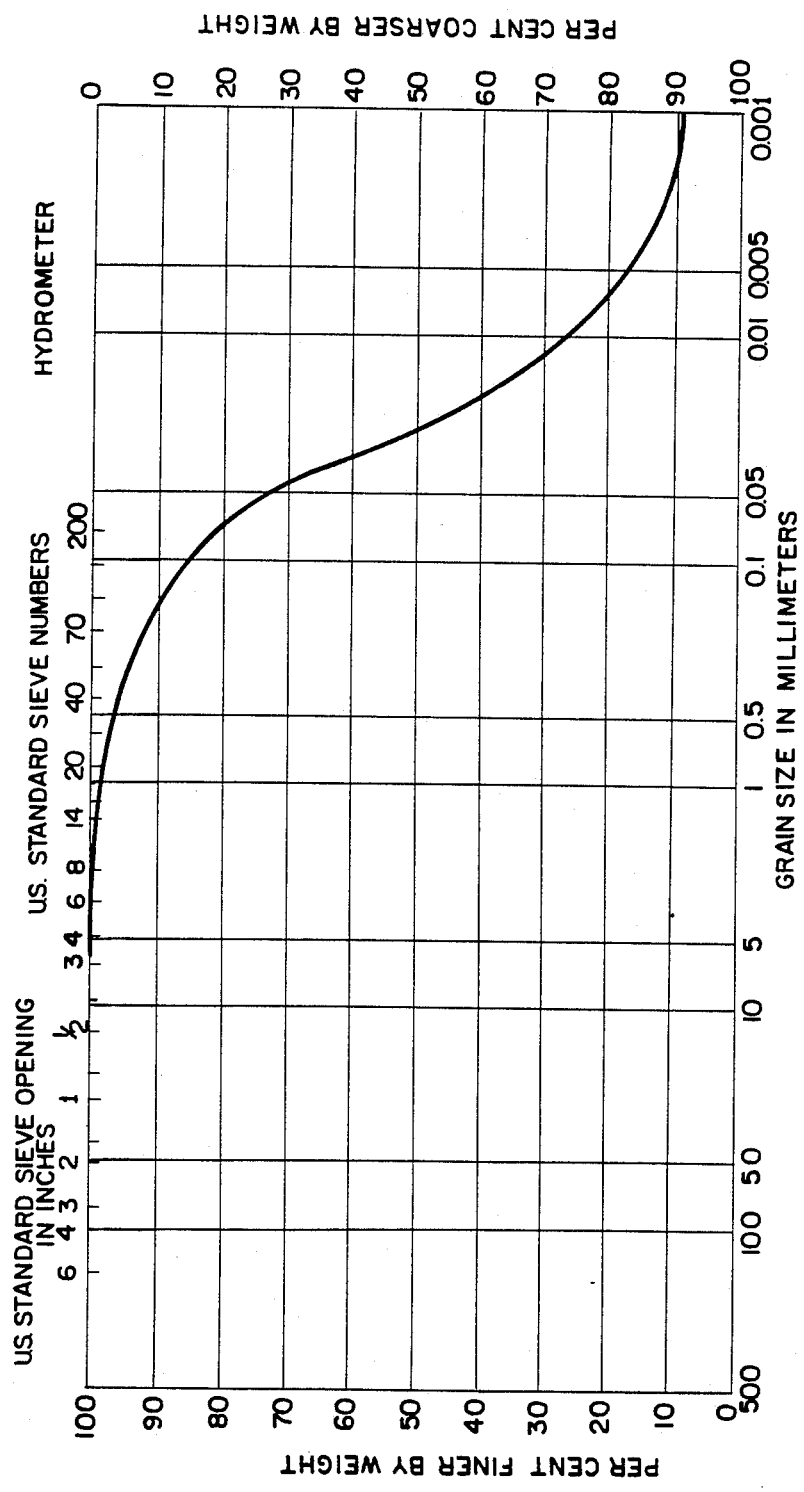

Other features and advantages of the present invention will be apparent from the following description of a preferred embodiment representing the best mode of carrying out the invention as presently perceived, which description would be considered in conjunction with the accompanying drawings in which:

FIG. 1 is a schematic view of the California Bearing Ratio test equipment used to determine CBR values of the stabilized organic sludge;

FIG. 2 is a graphic representation of the density of organic sludge samples stabilized with the compound and methods of the present invention in relationship to their moisture content; and FIG. 3 is a graphic representation of the grain size in millimeters of organic sludge samples stabilized with the compounds and methods of the present invention in relationship with the % by weight of the stabilized waste samples that have grain sizes varying from coarse to fine.

An organic slude is a collection of organic and inorganic multiphase solids, semisolids, and liquid waste resulting from industrial operations. These materials commonly have no economic productive value or usage. Organic sludges are found in numerous settings including waste lagoons, settling ponds, sludge ponds from chemical processing plants and other waste sites that occur throughout industry. These organic sludges may also contain hazardous waste (Resource Conservation and Resource Act, 42 U.S.C. § 6903(5) (1976)).

In the present invention, organic sludge is stabilized by mixing it with Portland cement, fly ash, calcium sulfate dihydrate, and lime, and, if desired, a stabilizing agent such as clay, recycled rubber, or asphaltene, and an adsorbent substance. Water can be added as needed. These materials can be added to the organic sludge individually or as a premix. Any conventional mixing means may be employed—e.g., a drag bucket or backhoe. The resulting composition has a soil-like consistency which can be handled with any conventional earth-moving equipment. Because of the resultant composition's physical characteristics, it can be compacted after curing to densities that show low water permeability and high stability. Also because of the physical characteristics of the resulting composition, the stabilized organic sludge can be moved and shaped without fear of settling and distortion, thus facilitating the use of normal remedial programs including the use of various conventional liner and capping technologies. Additionally, because the stabilized organic sludge does take on a soil-like consistency, it can be readily transported to more suitable landfill sites, if necessary, with a minimum of handling costs. The resulting stabilized composition can be used for land reclamation purposes or for road building.

The chemical reactions that occur when the compositions of the present invention are mixed with the organic sludges are not completely understood. Fly ash is a waste material, normally recovered from coal-burning furnaces, comprised largely of silica-alumina and iron compounds, together with unburned carbon from the coal. In the method of the present invention, fly ash is believed to act as a pozzolanic material—i.e., a material that reacts with lime in the presence of water at ordinary temperatures to produce a cementitious compound. The calcium sulfate dihydrate is believed to act initially as an absorbent, and more important as an accelerator for the rate of hydration of the calcium silicates, while at the same time retarding the rate of hydration for the calcium aluminates, thus assuring an even set throughout the admixture. There is some evidence that it also acts as a plaster-like stabilizer. This is somewhat surprising as the calcium sulfate dihydrate would normally have to be calcined to its hemi-hydrate form before plaster formation could occur.

The Portland cement acts like other hydraulics, wherein the tricalcium silicate reacts with water to set up as a hard, infusible mass. In other words, the Portland cement plays an important chemically functional role in forming the cementitious, yet soil-like, stabilized sludge compositions in accordance with this invention. Without the Portland cement, the treated sludge does not develop sufficient strength at economical dosage levels to provide a reasonable alternative for stabilization of industrial organic sludges.

The importance of the Portland cement is three-fold: (1) to provide greater cure strengths; (2) to provide much greater strength early in the curing process; and (3) to achieve less volume expansion (typically not more than 20%) due to lower overall treatment levels. Moreover, leachate tests and water permeability studies have shown excellent results when Portland cement is included in the composition. Numerous laboratory and field tests have confirmed favorable stabilization results for a wide variety of industrial organic sludges.

It has been found from experimentation that it is best to add the Portland cement last in the mixing process to maximize its benefit as a binder.

In a commercial setting, the mixing and subsequent stabilization of the organic sludge with the compositions of the present invention can be carried out with most conventional mixing techniques. In the laboratory, various mixing techniques can be utilized as long as a thorough mix between the waste and the composition of the present invention is achieved.

The following operating examples will more fully illustrate the invention and the best mode for the practice thereof.

EXAMPLE 1

A number of tests were performed on samples of an organic sludge obtained from a waste lagoon at a chemical plant engaged in processing petroleum-derived resins and chemicals. The samples upon analysis typically contained 43% by weight organics, 3% solids, and 54% water. Each of the samples was mixed with Portland cement, fly ash, and calcium sulfate in the proportions (% by weight, based on organics and solids content of the sample) set forth below in Table 1, and, after thorough mixture, was allowed to cure to a stable penetration value. The Portland cement and fly ash contained sufficient lime to assure that the pozzolanic reaction would occur. Penetrometor readings were then taken to provide measurements of the degree of solidification that occurred upon reaction of the compositions with the waste but prior to compaction of the resultant mass. The higher the penetrometer reading, the greater the solidification, 4.5 (tons/square foot) being the maximum. A soil test Model CL-700 penetrometer was used to take the readings. The results of these tests are tabulated in Table 1.

TABLE 1

| Test No. | Cement | Fly Ash | CaSO$_4$ | Pen |
|---|---|---|---|---|
| 1 | 32% | 54% | 54% | 2.7 |
| 2 | 32% | 54% | 43% | 2.9 |
| 3 | 32% | 54% | 32% | 2.7 |
| 4 | 32% | 54% | 22% | 2.6 |
| 5 | 32% | 54% | 11% | 2.2 |
| 6 | 32% | 43% | 54% | 3.7 |
| 7 | 32% | 43% | 43% | 2.8 |
| 8 | 32% | 43% | 32% | 3.5 |
| 9 | 32% | 43% | 22% | 2.3 |
| 10 | 32% | 43% | 11% | 2.4 |
| 11 | 32% | 32% | 54% | 3.0 |
| 12 | 32% | 32% | 43% | 2.3 |
| 13 | 32% | 32% | 32% | 2.8 |
| 14 | 32% | 32% | 22% | 2.2 |
| 15 | 32% | 32% | 11% | 1.7 |
| 16 | 32% | 22% | 54% | 3.2 |
| 17 | 32% | 22% | 43% | 2.5 |
| 18 | 32% | 22% | 32% | 2.4 |

These test results demonstrate the fact that the organic sludge reacted with the compositions of the present invention to form a firmer, more stable final composition.

EXAMPLE 2

In a field test, a conventional road tiller was used as a high-volume mixing means to commingle an organic sludge, obtained from another portion of the lagoon of Example 1, containing approximately 50% organic materials, 5% solids, and approximately 45% water, with about 24% Portland cement, 72% of a mixture containing equal parts fly ash and filter cake from a sulfur dioxide scrubbing unit, the filter cake containing calcium sulfate, calcium sulfite, and lime, and 9% clay (all based on organics and solids of the sludge). The resultant mix solidified into a soil-like composition after a short period of time, and could be readily bulldozed and stockpiled within a few days. The material exhibited superb soil-like properties with such structural integrity that a caterpillar bulldozer was readily supported on its surface, thus demonstrating that a capping operation could be carried out.

EXAMPLE 3

In a second field test, a drag bucket was used to mix a composition made in accordance with the present invention with an organic sludge obtained from another portion of the waste lagoon of Example 1, having an organic content of approximately 50%, a solids content of approximately 10%, and a water content of approximately 40%. This waste was mixed with 25.5% Portland cement, 85% of a mixture containing equal parts fly ash and filter cake from a sulfur dioxide scrubbing unit (the filter cake containing calcium sulfate, calcium sulfite, and lime), and 15% clay (based on the organics and solids content of the waste). The resultant mix solidified into a stable soil-like composition after a short period of time, exhibiting a number of highly desirable characteristics, including high density, low permeability, and a low expansion ratio. The structural integrity and resultant density of the stabilized sludge was analogous to that experienced in Example 2. The sludge stabilized to a depth of 6 feet could support heavy equipment with no notable settling or distortion. The stabilized sludge was subjected to extensive soil and environmental testing, the results of which are contained in Table 2.

TABLE 2

| | |
|---|---|
| Dry density | 92.5 lb/ft$^3$ |
| Moisture content | 18.1% |
| California bearing ratio | 4.0 |
| Soil classification | MC-CL - silty clay |
| Maximum dry density | 101.01 lb/ft$^3$ |
| Optimum moisture content | 17.0% |
| Atterberg Limits: | |
| Liquid limit | 27.7 |
| Plastic limit | 22.6 |
| Plastic index | 5.1 |
| Permeability | 2.59 × 10$^{-5}$ cm/sec. |
| Leachate Quality: | |
| Ba | 1.2 mg/l (limit = 100) |
| Other metals | None detected |
| Total organics | 27.7 mg/l |
| Dicylopentadiene | 1.0 mg/l |
| Naphthalene | 3.5 mg/l |
| Trimethylbenzenes | 0.3 mg/l |
| Methylnaphthalenes | 0.8 mg/l |
| 3-ring aromatics | 0.2 mg/l |
| Hexachlorocyclopentadiene | None detected |
| Chlordane | None detected |
| Volume increase upon treatment | Negligible |

The data generated by these extensive soil and environmental tests, together with visual observation made after stabilization of the sludge, contained some surprising and unexpected results, the most notable being the low permeability of the resultant composition, its high density, and its low expansion ratio after stabilization.

The permeabilities obtained in this and other subsequent field testing were within 1 to 2 orders of magnitude of the permeability constants required for liners in the RCRA regulations. This indicates that the stabilized sludge permits water to permeate at only a slightly higher rate than that permitted for liners designed to hold and contain the original sludge material. The result is an environmentally more secure site. The California Bearing Ratio value that was obtained in this and other subsequent field samplings indicates that the stabilized sludge is of a quality that would support a cap following a lining and capping operation. In other words, the density and structural integrity of the resulting composition is such that it minimizes the amount of settling due to compression. Once a cap has been formed on the stabilized waste, there is no danger of settling that would cause distortion of the surface of the cap, thus destroying its effectiveness.

Finally, the resultant composition showed an extremely low expansion ratio. The stabilized sludge had little to no volume increase upon mixing with the composition of the present invention, unlike many other stabilization techniques in which a 100% increase in volume is not unexpected. This can be important to a sludge disposal site operator who wishes to stabilize his sludge pond, yet has a limited space in which to do so.

All of the parameters tested, including the California Bearing Ratio, the Atterberg limits, and the leachate quality levels indicate that the sludge, upon mixing with the composition of the present invention, had been stabilized to a soil-like composition that substantially fixed all of the organics in the sludge material.

EXAMPLE 4

Extensive tests were conducted on samples obtained from a sludge lagoon containing 14% organics, 47% solids, and 39% water. A preliminary series of small scale tests was run to determine what percentages of Portland cement, calcium sulfate dihydrate, fly ash, and lime would yield the most stable end product upon treatment of the waste from the pond. It was found that for this particular pond the most effective composition in terms of result and cost contained 85% of a mixture containing equal parts fly ash and filter cake from a sulfur dioxide scrubbing unit (the filter cake containing calcium sulfate, calcium sulfite, and lime), and 15% clay (based on the organics and solids content of the waste). The resultant composition set within a 24-hour period.

The permeability of the stabilized sludge was determined at various depths utilizing various parameters. The parameters, equations, and results of these tests are tabulated in Table 3.

TABLE 3

| | Dry Density | Moisture Content | Sample Location |
|---|---|---|---|
| Constant Head Permeability | | | |
| Sample #1 | 90.9 p.c.f. | 39.3% | B-3 @ 6.5' |
| Sample #2 | 89.2 p.c.f. | 41.2% | 8-4 @ 6.0' |

Constant head permeability = QL/tHA, = 6.8 × 10$^{-5}$ cm/sec,
where: Q = total quantity of water which flows through the sample in an elapsed time
L = length of sample in permeater
t = time of test
h = total head lost
A = cross sectional area of the permeameter

| | Dry Density | Moisture Content | Sample Location |
|---|---|---|---|
| Falling Head Permeability | | | |
| Sample #3 | 97.0 p.c.f. | 22.0% | B-3 @ 10.3' |
| Sample #4 | 96.2 p.c.f. | 23.5% | B-3 @ 11.0' |
| Sample #5 | 95.8 p.c.f. | 24.2% | B-4 @ 10.3' |

Falling head permeability = $2.3 \frac{aL}{At} (\log_{10} H_0/H_1)$ where:
a = cross sectional area of the standpipe
L = length of the sample
A = cross sectional area of the sample
t = time of the test
H$_0$ = original hydraulic head
H$_1$ = final hydraulic head
k = 6.6 × 10$^{-6}$ cm/sec The results of the stabilization is a low overall permeability constant for the treated sludge, within an order of magnitude of those required under RCRA for liner permeabilities. Once again, this indicates that the stabilized sludge permits water permeation at only a slightly greater rate than that permitted for liners under RCRA regulations. The result is once again an environmentally more secure pond.

The density of the material was determined using the California Bearing Ratio Test and ASTM D-690 method A. Referring to FIG. 1, a schematic of the field California Bearing Ratio equipment set up is illustrated. A mechanical jack 10 is supported from an A-frame 12 above the test pit 14. The jack 10 can deliver various loads to drive a penetration piston 16 into the test material at various depths. The results of these tests are tabulated in Table 4.

TABLE 4

| Penetration | Bearing Ratio Values | |
|---|---|---|
| | Load (psi) | Field CBR Value |
| .100 | 40 | 4.0 |
| .200 | 55 | 3.7 |
| .300 | 65 | 3.4 |
| .400 | 75 | 3.3 |
| .500 | 80 | 3.1 |

It can be seen from the test results that the stabilized sludge exhibits excellent soil-like properties. The stabilized sludge is of such a density and structural integrity that it provides a stable base upon which capping operations can be performed without fear of settling due to compression that can lead to distortion of the cap. A bulldozer operator can maneuver his equipment upon the treated sludge without fear that the sludge will not support the bulldozer and the weight of the cap.

Referring to FIG. 2, the maximum dry density and the optimum moisture content of the treated sludge were determined using ASTM D-690 Method A. It can be seen that the maximum dry density for the treated waste was 101 pounds per cubic feet, with an optimum moisture content of 17%. The Atterberg Limits were as follows: liquid limit 27.6; plastic limit 22.6; and PI 5.1. All these results are indicative of the fact that the stabilized sludge had taken on soil-like characteristics that resulted in low permeability and high stability.

The percent of treated sludge having a grain size identical to that of salt or clay was approximately 92% as shown in FIG. 3. This characteristic would be expected owing to the low permeability shown by the stabilized sludge.

Once again, it can be seen from the data that organic sludges stabilized in accordance with the present invention take on a soil-like character exhibiting numerous properties that assist an organic sludge disposal site operator in handling the waste at his facility in a more ecologically and economically sound manner.

A leachate quality study was also performed on leachate of the treated sludge. Samples 1, 2, 3, 4, 5, and 6 were taken from various parts of the stabilized sludge lagoon.

The results of these tests are tabulated in Tables 5, 6, 7,

TABLE 5

| Sample | Sample Description | Organics | | | | | |
|---|---|---|---|---|---|---|---|
| | | 2,4,-D | 2,4,5-TP | Lindane | Endrin | Methoxychlor | Toxaphene |
| (1) | Field Sample 1 | ND | ND | ND | ND | ND | ND |
| (2) | Field Sample 2 | ND | ND | ND | ND | ND | ND |
| (3) | Field Sample 3 | ND | ND | ND | ND | ND | ND |
| (4) | Field Sample 4 | ND | ND | ND | ND | ND | ND |
| (5) | Field Sample 5 | ND | ND | ND | ND | ND | ND |
| (6) | Field Sample 6 | ND | ND | ND | ND | ND | ND |
| LIMIT OF DETECTION | | 0.1 | 0.2 | 0.06 | 0.01 | 5.7 | 0.5 |
| EP-TOX MAX ALLOWABLE | | 10.0 | 1.0 | 0.4 | 0.02 | 10.0 | 0.5 |

ND = Not detected at the stated limit of detection

TABLE 6

| Sample | Description | Metals | | | | | | | |
|---|---|---|---|---|---|---|---|---|---|
| | | Ba | Cr | Pb | Cd | Ag | As | Se | Hg |
| (1) | Field Sample 1 | 0.9 | ND | ND | ND | ND | ND | ND | ND |
| (2) | Field Sample 2 | 1.5 | ND | ND | ND | ND | ND | ND | ND |
| (3) | Field Sample 3 | 1.2 | ND | ND | ND | ND | ND | ND | ND |
| (4) | Field Sample 4 | 0.6 | ND | ND | ND | ND | ND | ND | ND |
| (5) | Field Sample 5 | 1.6 | ND | ND | ND | ND | ND | ND | ND |
| (6) | Field Sample 6 | 1.8 | 0.6 | ND | ND | ND | ND | ND | ND |
| LIMIT OF DETECTION | | 0.5 | 0.5 | 0.5 | 0.5 | 0.5 | 0.5 | 0.5 | 0.001 |
| EP-TOX MAX ALLOWABLE | | 100.0 | 5.0 | 5.0 | 1.0 | 5.0 | 5.0 | 1.0 | 0.2 |

ND = Not detected at the stated limit of detection

TABLE 7

| | Concentration Breakdown of Organics in Sludge Lagoon | | | | | |
|---|---|---|---|---|---|---|
| Sample | Total Organics mg/l | Dicyclo-Pentadiene mg/l | Naphthalene mg/l | Trimethylbenzenes mg/l | Methylnaphthalenes mg/l | 3-Ring Aromatics mg/l |
| (1) | 3.2 | 0.4 | 1.6 | 0.1 | 0.4 | 0.1 |
| (2) | 24.0 | 0.3 | 5.2 | 1.8 | 0.4 | 0.1 |
| (3) | 27.7 | 1.0 | 3.5 | 0.3 | 0.8 | 0.2 |
| (4) | 17.2 | 0.2 | 4.6 | 0.7 | 0.5 | 0.1 |
| (5) | 12.5 | 0.1 | 4.8 | 0.7 | 0.5 | 0.1 |
| (6) | 5.6 | 0.1 | 3.6 | 0.4 | 0.4 | 0.03 |

TABLE 8

| | Percent Breakdown of Organics in Sludge Lagoon | | | | | |
|---|---|---|---|---|---|---|
| Sample | Dicyclopentadiene | Naphthalene | Trimethyl-Benzenes | Methylnaphthalenes | 3-Ring Aromatics | Remaining Organics |
| (1) | 13 | 50 | 1 | 13 | 3 | 18 |
| (2) | 1 | 22 | 8 | 2 | 0.4 | 66.6 |
| (3) | 4 | 13 | 1 | 3 | 1 | 78 |
| (4) | 1 | 27 | 4 | 4 | 3 | 61 |
| (5) | 1 | 38 | 6 | 4 | 1 | 50 |
| (6) | 2 | 64 | 7 | 7 | 0.5 | 19.5 |

A mixture of fly ash, calcium sulfate, and lime is not sufficient by itself to stabilize industrial organic sludges. A section of the waste lagoon referred to in Examples 1, 2, 3, and 4 above was treated with a mixture of flush ash, calcium sulfate, and lime in their optimum proportions. The mixture comprised from about 40% to 50% calcium sulfate, from about 40% to 50% fly ash, and from about 0.5% to 10% lime. The section included 300 grams of sludge to be treated. In the field, of course, the amounts are more difficult to control exactly. A mixture of 58 grams of fly ash, 58 grams of calcium sulfate, and 4 grams of lime was added to the section. A first sample of this treated sludge was removed before adding Portland cement to the remainder of the section. After 24 hours, the first sample without Portland cement showed a compressive strength of less than 200 pounds/square foot. This first sample was kept in the laboratory for 14 days, at which time the first sample still showed unconfined compressive strength of 100–200 pounds/square foot. Unconfined compressive strength means that the sample was not confined by any border, container, or other means for constraining the sample. A second sample of the treated sludge was removed from the section after 14 days and treated with Portland cement in a proportion corresponding to that amount (i.e., 45 grams) which would have been added to the entire section in accordance with my calcined method of stabilization. After 24 hours, the second sample showed unconfined compressive strength well in excess of 9,000 pounds/square foot (the limit of the measuring device). The second sample treated with Portland cement continued to maintain an unconfined compressive strength exceeding 9,000 pounds/square foot after 15 days.

Other samples from the same lagoon were treated in the laboratory with various amounts of fly ash, calcium sulfate, lime, and Portland cement. The purpose of these trials was to gather data from the use of different amounts of each component. The results of these trials are shown in the following Table 9 (percentages are based upon the weight of the sample being treated):

TABLE 9

(Laboratory)
TRIALS WITH SLUDGE FROM LAGOON IDENTIFIED
IN EXAMPLES 1, 2, 3, and 4

| Sample # | % Fly Ash | % $CaSO_4$ | % Lime | Portland % Cement | Unconfined Compressive Strength (Tons/Sq. Ft.) 3 Day | 10 Day |
|---|---|---|---|---|---|---|
| 1 | 50 | — | 5 | — | 0.0 | 0.8 |
| 2 | 60 | — | 15 | — | 0.2 | 1.3 |
| 3 | 40 | 10 | 15 | — | 0.5 | 1.5 |
| 4 | 30 | 30 | — | 15 | 1.3 | 3.0 |
| 5 | 100 | — | 10 | — | 1.2 | 2.3 |
| 6 | 20 | 40 | 3.3 | 10 | 1.9 | 3.3 |
| 7 | 33 | 16.7 | 12.5 | — | 0 | 0.5 |
| 8 | 40 | — | 15 | — | 0 | 0.5 |

EXAMPLE 5

The following tests were conducted using #6 fuel oil to demonstrate the importance of the Portland cement. Numerous samples of #6 fuel oil were treated with different combinations of fly ash, calcium sulfate, lime, Portland cement, and water. In some trials, a premixed mixture of calcium sulfate ($CaSO_4$), lime, and fly ash was used. The premixed mixture comprised from about 40% to 50% $CaSO_4$, from about 0.05% to 10% lime, and from about 40% to 50% fly ash. The unconfined compressive strength of each sample was measured after 1 week, 2 weeks, 3 weeks, 5 weeks, and 35 weeks. The results of these tests are shown in the following Table 10 (percentages are based upon the weight of the sample being treated):

TABLE 10

STABILIZATION OF #6 FUEL OIL
(Laboratory)

No. Portland Cement

| Sample # | % Calcium Sulfate and Lime | % Fly Ash | % $H_2O$ | Unconfined Compressive Strengths (Tons/Sq. Ft.) | | | | |
|---|---|---|---|---|---|---|---|---|
| | | | | 1 Week | 2 Weeks | 3 Weeks | 4 Weeks | 35 Weeks |
| 1 | 230 | — | — | 0 | 1.5 | 2.0 | 2.1 | 3.0 |
| 2 | 184 | 46 | — | 0 | 1.2 | 1.4 | 1.5 | 2.8 |
| 3 | 138 | 92 | — | 0 | 0.5 | 0.75 | 0.9 | 2.0 |
| 4 | 92 | 138 | — | 0 | 0.1 | 0.1 | 0.5 | 1.9 |
| 5 | 46 | 184 | — | 0 | 0 | 0 | 0.1 | 1.2 |
| 6 | — | 230 | — | 0 | 0 | 0 | 0.7 | 1.5 |
| 7 | 120 | — | — | 0 | 0 | 0 | 0 | 0 |
| 8 | 96 | 24 | — | 0 | 0 | 0 | 0 | 0 |
| 9 | 72 | 48 | — | 0 | 0 | 0 | 0 | 0 |
| 10 | 48 | 71 | — | 0 | 0 | 0 | 0 | 0 |
| 11 | 24 | 96 | — | 0 | 0 | 0 | 0 | 0 |
| 12 | — | 120 | — | 0 | 0 | 0 | 0 | 0 |

| Sample # | % $CaSO_4$ | % Fly Ash | % $H_2O$ | 1 Week | 2 Weeks | 3 Weeks | 4 Weeks | 35 Weeks |
|---|---|---|---|---|---|---|---|---|
| 13 | 230 | — | 31 | 0 | 1.4 | 1.75 | 2.0 | 1.75 |
| 14 | 184 | 46 | 30 | 0 | 0.9 | 1.4 | 1.7 | 1.75 |
| 15 | 138 | 92 | 30 | 0 | 0.7 | 0.85 | 1.2 | 1.5 |
| 16 | 92 | 138 | 32 | 0 | 0.25 | 0.30 | 0.5 | 1.7 |
| 17 | 46 | 184 | 31 | 0 | 0 | 0.1 | 0.2 | 1.25 |
| 18 | 0 | 230 | 31 | 0 | 0 | 0.1 | 0.15 | 1.0 |
| 19 | 120 | — | 20 | 0 | 0 | 0 | 0 | 0.3 |
| 20 | 96 | 24 | 20 | 0 | 0 | 0 | 0 | 0.25 |
| 21 | 72 | 48 | 20 | 0 | 0 | 0 | 0 | 0.3 |
| 22 | 48 | 72 | 20 | 0 | 0 | 0 | 0 | 0.3 |
| 23 | 24 | 96 | 20 | 0 | 0 | 0 | 0 | 0.15 |
| 24 | — | 120 | 20 | 0 | 0 | 0 | 0 | 0.3 |

| Sample # | % $CaSO_4$ | % Fly Ash | % Portland Cement | % $H_2O$ | 1 Week | 2 Weeks | 3 Weeks | 4 Weeks | 35 Weeks |
|---|---|---|---|---|---|---|---|---|---|

TABLE 10-continued

STABILIZATION OF #6 FUEL OIL
(Laboratory)

| No. | Portland Cement | | | | Unconfined Compressive Strengths (Tons/Sq. Ft.) | | | | |
|---|---|---|---|---|---|---|---|---|---|
| 25 | 100 | — | 20 | 20 | 0 | 0 | 0.1 | 0.2 | 0.7 |
| 26 | 80 | 20 | 20 | 20 | 0 | 0 | 0.2 | 0.4 | 0.85 |
| 27 | 60 | 40 | 20 | 20 | 0 | 0 | 0.1 | 0.25 | 0.75 |
| 28 | 40 | 60 | 0 | 20 | 0 | 0 | 0.2 | 0.15 | 0.95 |
| 29 | 20 | 80 | 20 | 20 | 0 | 0 | 0.1 | 0.2 | 0.55 |
| 30 | — | 100 | 20 | 20 | 0 | 0 | 0.1 | 0.1 | 0.25 |
| 31 | 155 | — | 25 | 25 | 0.25 | 1.25 | 1.4 | 1.9 | 2.6 |
| 32 | 124 | 31 | 25 | 25 | 0.3 | 0.9 | 1.3 | 1.6 | 2.2 |
| 33 | 93 | 62 | 25 | 25 | 0.5 | 0.5 | 0.6 | 0.8 | 1.8 |
| 34 | 62 | 93 | 25 | 25 | 0.35 | 0.5 | 0.6 | 0.6 | 0.9 |
| 35 | 31 | 124 | 25 | 25 | 0.5 | 0.5 | 0.7 | 0.5 | 0.8 |
| 36 | — | 155 | 25 | 25 | 0.1 | 0.5 | 0.3 | 0.3 | 1.0 |
| 37 | 200 | — | 30 | 30 | 1.0 | 2.5 | 2.75 | 2.2 | 2.5 |
| 38 | 160 | 40 | 30 | 30 | 1.8 | 2.2 | 2.3 | 2.3 | 2.75 |
| 39 | 120 | 80 | 30 | 30 | 0.9 | 1.1 | 1.4 | 1.4 | 2.1 |
| 40 | 80 | 120 | 30 | 30 | 0.9 | 1.1 | 1.6 | 1.6 | 2.25 |
| 41 | 40 | 160 | 30 | 30 | 0.7 | 0.8 | 0.8 | 1.1 | 1.75 |
| 42 | — | 200 | 30 | 30 | 0.7 | 1.1 | 1.5 | 1.0 | 1.45 |

| Sample # | % Mixture of Calcium Sulfate, Lime, and Fly Ash | % Portland Cement | % H$_2$O | 1 Week | 2 Weeks | 3 Weeks | 5 Weeks | 35 Weeks |
|---|---|---|---|---|---|---|---|---|
| 43 | 230 | — | 30 | 0.25 | 1.6 | 2.35 | 2.4 | 1.9 |

EXAMPLE 6

Sludge samples from various lagoons other than the one referenced in Examples 1, 2, 3, and 4 above were treated in accordance with the present invention. Each of the lagoons contained different types of industrial organic sludge materials. These treatments were performed in the laboratory, and each further demonstrates the importance of the Portland cement. The mixture of calcium sulfate, lime, and fly ash that was used comprised from about 40% to 50% calcium sulfate, from about 0.05% to 10% lime, and from about 40% to 50% fly ash. Treatment of samples taken from three different lagoons is shown in the following Table 11 (percentages are based upon the weight of the sample being treated):

TABLE 11

Lagoon #1
Contained about 40% solids (including cyanide), 30% oil and grease, and 30% water with some lead and chromium.

| Sample # | % Mixture of Calcium Sulfate, Lime, and Fly Ash | % Portland Cement | % H$_2$O | Unconfined Compressive Strengths (Tons/Sq. Ft.) | |
|---|---|---|---|---|---|
| | | | | 3 Day | 7 Day |
| 1 | 20 | 10 | 10 | 3.7 | 4.5+ |
| 2 | 20 | 5 | 10 | 3.3 | 4.5+ |

Lagoon #2
Contained aluminum sulfate, traces of arsenic, barium, cyanide, and formaldehyde, toluene, and acrylamide.

| Sample # | % Mixture of Calcium Sulfate, Lime, and Fly Ash | % Portland Cement | % H$_2$O | Unconfined Compressive Strengths (Tons/Sq. Ft.) | |
|---|---|---|---|---|---|
| | | | | 7 Day | 12-Day |
| 1 | 10 | 5 | 5 | 1.75 | 2.00 |
| 2 | 20 | 5 | 5 | 1.33 | 2.12 |
| 3 | 20 | 10 | 10 | 1.66 | 2.25 |
| 4 | 30 | 10 | 15 | 0.92 | 2.00 |
| 5 | 40 | 10 | 20 | 0.66 | 1.08 |
| 6 | 50 | 12.5 | 25 | 1.17 | 1.33 |
| 7 | 60 | 15 | 30 | 0.97 | 1.58 |

Lagoon #3

TABLE 11-continued

Contained organic tars filled with soil and debris.

| Sample # | % Mixture of Calcium Sulfate, Lime, and Fly Ash | % Portland Cement | % H$_2$O | Tons/Sq.Ft. Unconfined Compressive Strength 7 Day |
|---|---|---|---|---|
| 1 | 20 | 5 | 10 | 4.5+ |
| 2 | 25 | 10 | 10 | 4.5+ |
| 3 | 50 | 12.5 | 15 | 4.5+ |

As demonstrated by the above tests and treatments of samples, attempts made to stabilize industrial organic sludges using only lime and fly ash (see Table 9) and various combinations thereof with calcium sulfate (see Tables 9 and 10) were unsuccessful. Only with the addition of Portland cement to a mixture of calcium sulfate, lime, and fly ash in proper proportions can one achieve results for economically treating industrial organic sludges which are not only good but better than those achieved by other stabilization processes. As shown in Table 10, the use of Portland cement results in early stabilization. In many stabilization projects for industrial organic sludge reasonable strength must be achieved within a short period of time so that equipment can be moved on the stabilized sludge.

EXAMPLES 7-11

Sludge samples from six different lagoons were treated in accordance with the sludge stabilization method of the present invention. A description of each sludge and the associated sludge stabilization results is reported below. Agent #1 is a mixture of equal amounts of fly ash and calcium sulfate, along with about 3% lime. Agent #2 is Portland cement.

EXAMPLE 7

Sludge Description: Very Acidic (pH=1-1.5); heavy settled solids sludge with water on the surface; density of the settled solids—12.5 pounds per gallon; contains primarily silica and gravel.

| Sample # | % Lime | % Agent #1 | % Agent #2 | 1 Day Pen | 21 Day Pen |
|---|---|---|---|---|---|
| 7a | 5 | 20 | 10 |  | 4.5+ |
| 7b | 3 | 20 | 5 | 2.3 | 1.3 |
| 7c | 3 | 10 | 5 | 1.3 | 1.2 |
| 7d | 3 | 10 | 10 | 4.5 | 2.3 |
| 7e | 3 | 20 | 8 | 4.4 | 2.4 |
| 7f | — | 20 | 8 | 4.5+ | 3.4 |

All 21 day pens, except 7a, tended to be dry and crumbly. Each sample cracked as the pens were being measured. Volume expansions: 10–20%.

EXAMPLE 8

Sludge Description: Sludge density—11.33 pounds per gallon, contains 8,000 ppm of pentachlorophenol, and 3,000 ppm of PAH (primarily Naphthalene); sludge has high water content.

| Sample # | % Agent #1 | % Agent #2 | 7-Day Pen | 15-Day Pen |
|---|---|---|---|---|
| 8a | 40 | 15 | 2.2* |  |
| 8b | 20 | 10 | 1.8* |  |
| 8c | 60 | 20 | 1.9* |  |
| 8d | 10 | 5 |  | 0.9* |
| 8e | 15 | 7 |  | 1.8* |
| 8f | 20 | 10 |  | 2.0* |
| 8g | 30 | 30 |  | 2.2* |
| 8h | 40 | 10 |  | 2.2* |
| 8i | 30 | 15 |  | 2.8* |
| 8j | 40 | 15 |  | 3.1* |
| 8k | 50 | 15 |  | 3.0* |

*Denotes mixtures that cracked under the given pressures of the penetrometer.

EXAMPLE 9

Sludge description: Oily sludge composite, density—8.3 pounds/gallon.

| Sample # | % Agent #1 | % Agent #2 | H₂O | 8-Day Pen | 24-Day Pen |
|---|---|---|---|---|---|
| 9a | 40 | 15 | — | 0 | 0 |
| 9b | 60 | 20 | — | 1.0 | 3.2 |
| 9c | 80 | 20 | — | 2.2 | 4.5+ |

EXAMPLE 10

Sludge description: Lamb Farm composite, density—13.2 pounds/gallon.

| Sample # | % Agent #1 | % Agent #2 | H₂O | 8-Day Pen | 24-Day Pen |
|---|---|---|---|---|---|
| 10a | 10 | 5 | 10 | 1.3 | 2.6 |
| 10b | 20 | 10 | 10 | 4.5+ | 4.5+ |
| 10c | 50 | 5 | 5 | 4.5+ | 4.5+ |

EXAMPLE 11

Sludge description: A mixture of 83% of the sludge of Example 9 above and 17% of the sludge from Example 10 above.

| Sample # | % Agent #1 | % Agent #2 | 5-Day Pen | 21-Day Pen |
|---|---|---|---|---|
| 11a | 40 | 15 | 0 | 0.7 |
| 11b | 60 | 20 | 1.4 | 4.5+ |
| 11c | 80 | 20 | 1.7 | 3.4+ |

What is claimed is:

1. A method for the stabilization of organic sludge comprising waste resulting from industrial operations to form a stabilized sludge composition, which method consists essentially of mixing the sludge with about 20 to about 75% fly ash, about 11 to about 54% calcium sulfate dihydrate, and about 0.1 to about 10% lime, and adding about 1 to about 35% by weight Portland cement, based in each case on the organics and solids content of the sludge, in which method the Portland cement is added last to maximize its function as a binder for the stabilized sludge composition.

2. The method of claim 1 wherein the sludge is also mixed with up to about 25% clay based on the organics and solids content of the sludge.

3. The method of claim 1 wherein the sludge is also mixed with up to about 25% recycled rubber based on the organics and solids content of the sludge.

4. The method of claim 1 wherein the sludge is also mixed with up to about 25% asphaltene based on the organics and solids content of the sludge.

5. The method of claim 1 wherein the sludge is also mixed with an adsorbent for organic substances.

6. A method of stabilizing organic sludge comprising waste resulting from industrial operations to form a stabilized sludge composition having a soil-like consistency, which method consists essentially of mixing the sludge with about 20 to about 75% fly ash, about 30 to about 40% calcium sulfate dihydrate, and about 0.1 to about 5% lime, and adding about 5 to about 35% Portland cement, based in each case on the organics and solids content of the sludge, in which method the Portland cement is added last to maximize its function as a binder for the stabilized sludge composition.

7. The method of claim 6 wherein the sludge is also mixed with up to about 25% clay based on the organics and solids content of the sludge.

8. The method of claim 6 wherein the sludge is also mixed with up to about 25% recycled rubber based on the organics and solids content of the sludge.

9. The method of claim 6 wherein the sludge is also mixed with up to about 25% asphaltene based on the organics and solids content of the sludge.

10. The method of claim 6 wherein the sludge is also mixed with an adsorbent for organic substances.

11. A method for the stabilization of organic sludge comprising waste from industrial operations to form a stabilized sludge composition having a soil-like consistency, which method consists essentially of mixing the sludge with about 30 to about 70% fly ash, about 11 to about 54% calcium sulfate dihydrate, and about 0.1 to about 5% lime, and adding about 10 to about 30% Portland cement, based in each case upon the organics and solids content of the sludge in which method the Portland cement is added last to maximize its function as a binder for the stabilized sludge composition.

12. The method of claim 11 wherein the sludge is also mixed with up to about 25% clay based on the organics and solids content of the sludge.

13. The method of claim 11 wherein the sludge is also mixed with up to about 25% recycled rubber based on the organics and solids content of the sludge.

14. The method of claim 11 wherein the sludge is also mixed with up to about 25% asphaltene based on the organics and solids content of the sludge.

15. The method of claim 11 wherein the sludge is also mixed with an adsorbent for organic substances.

* * * * *